Sept. 26, 1967  J. H. CURRENT  3,343,607
NON-RETRIEVABLE BRIDGE PLUG
Original Filed Oct. 11, 1965  7 Sheets-Sheet 1

James H. Current
INVENTOR.

BY David L. Moseley

ATTORNEY

Sept. 26, 1967   J. H. CURRENT   3,343,607
NON-RETRIEVABLE BRIDGE PLUG
Original Filed Oct. 11, 1965   7 Sheets-Sheet 2
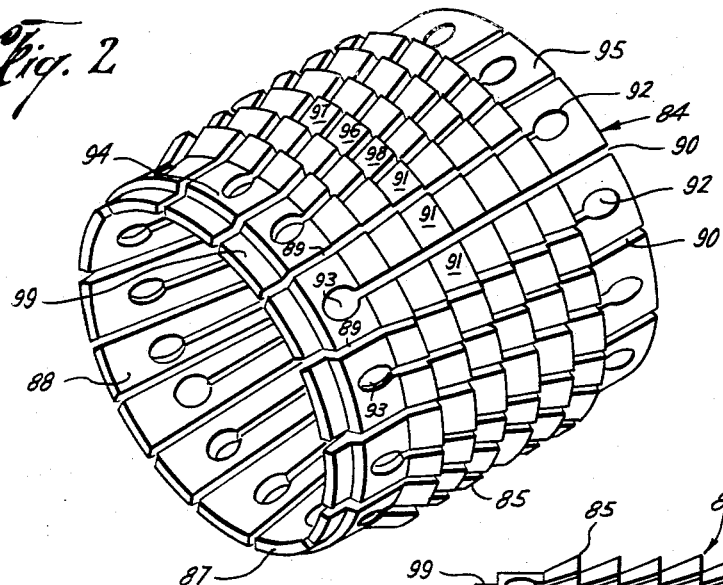
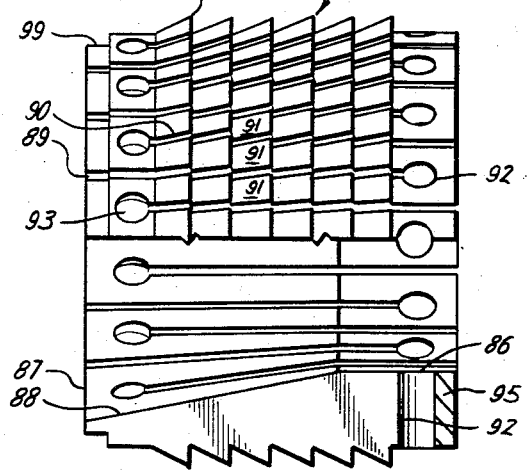
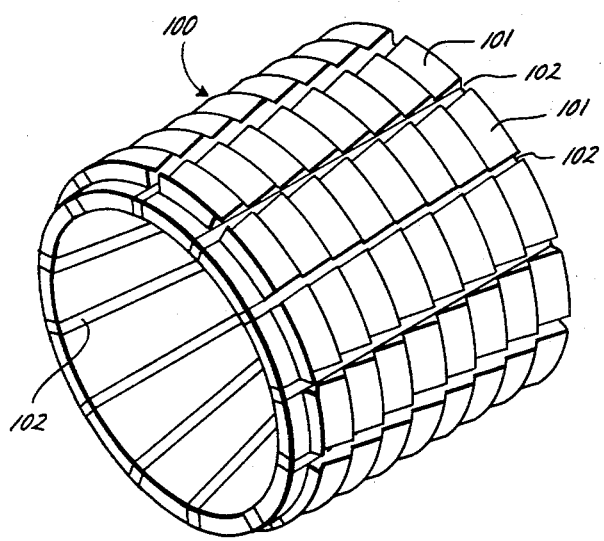
James H. Current
INVENTOR.
BY David L. Moseley
ATTORNEY James H. Current
INVENTOR.

BY *David L. Moseley*

ATTORNEY

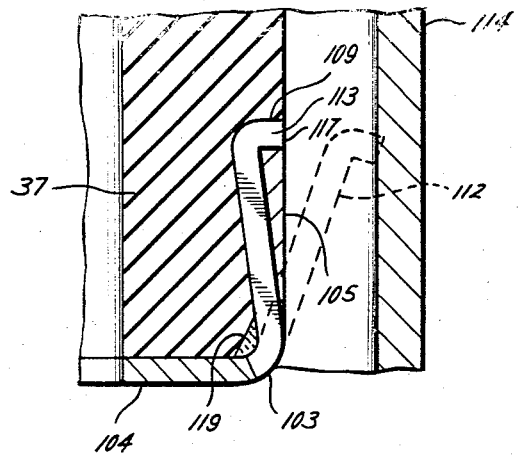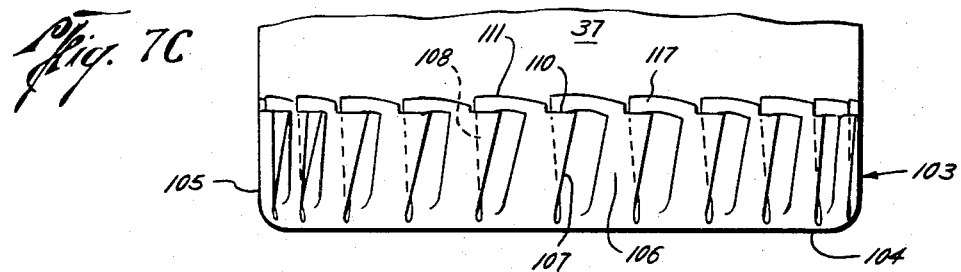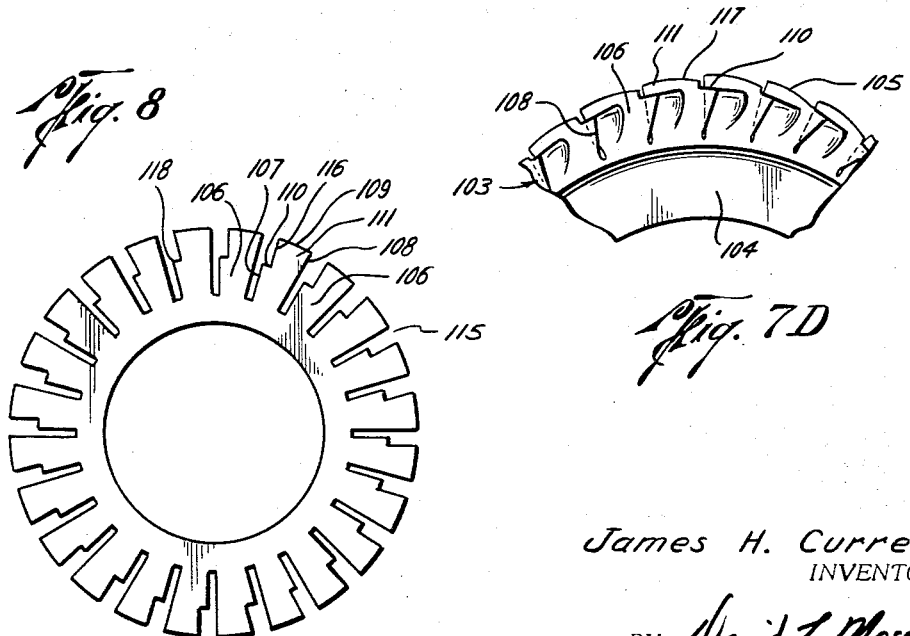

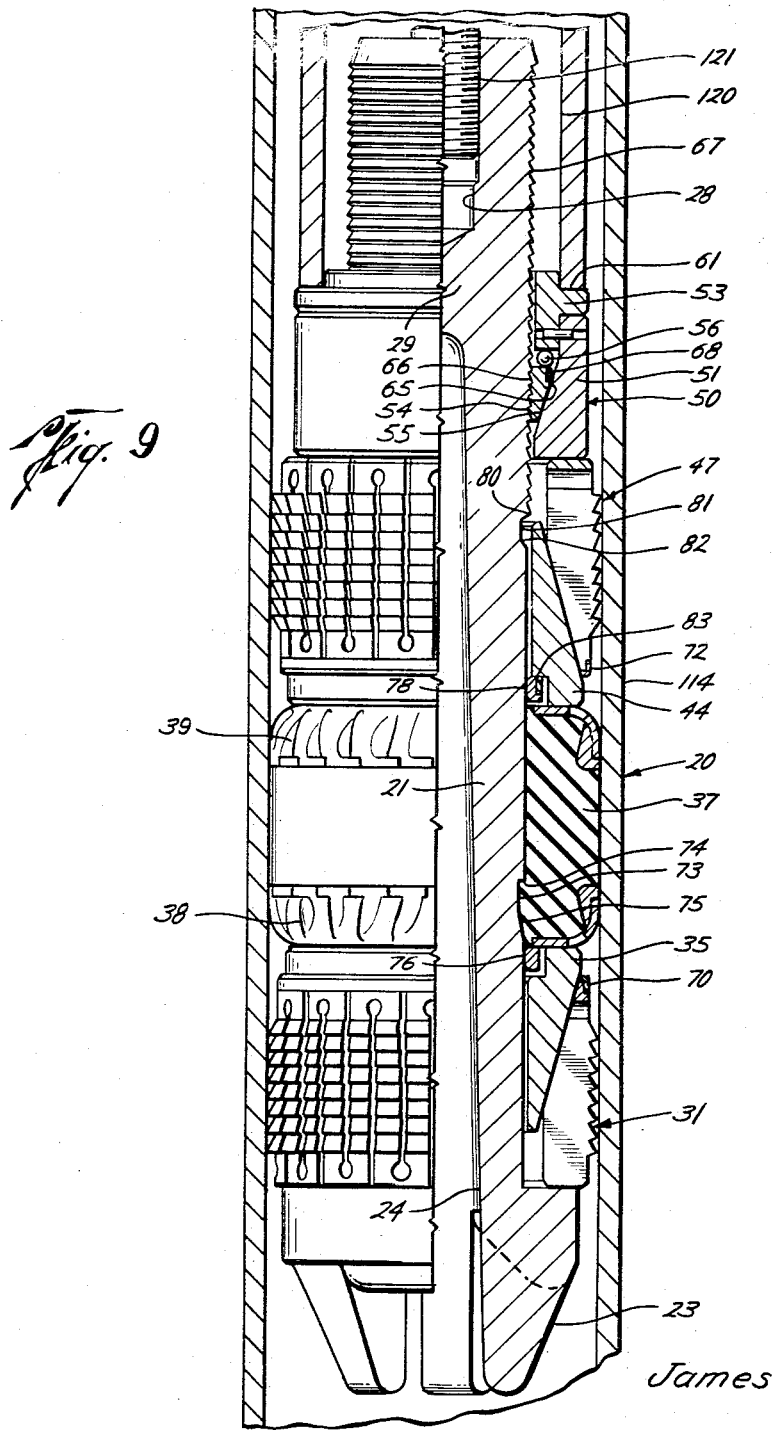

Sept. 26, 1967 J. H. CURRENT 3,343,607
NON-RETRIEVABLE BRIDGE PLUG
Original Filed Oct. 11, 1965 7 Sheets-Sheet 6
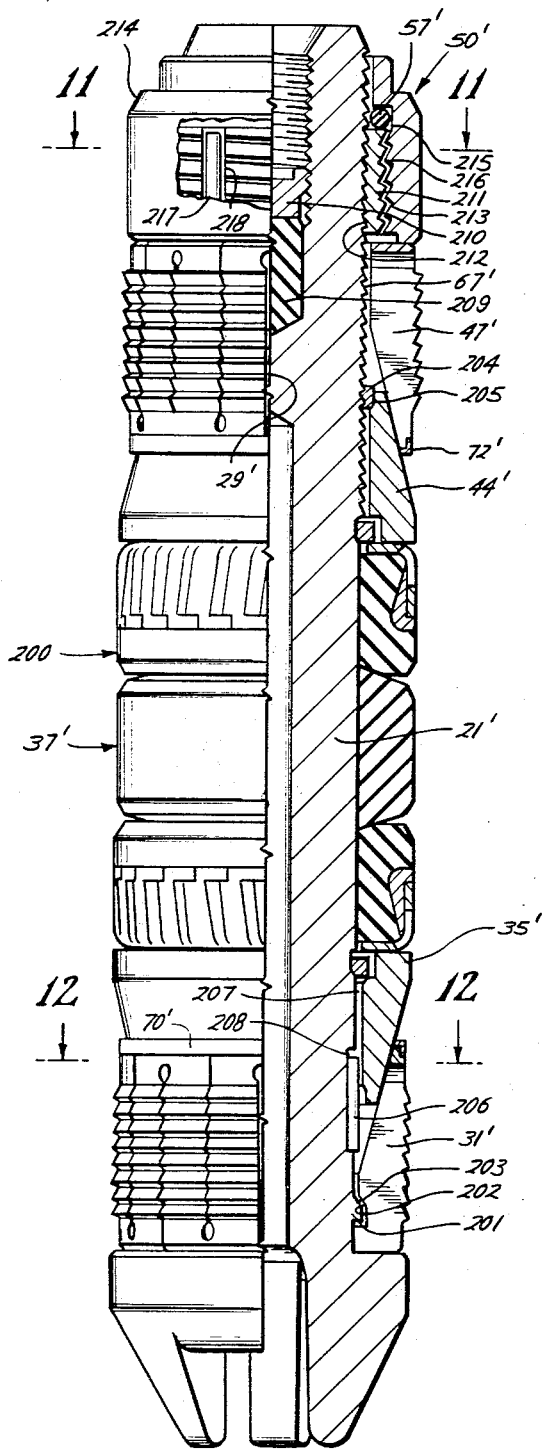
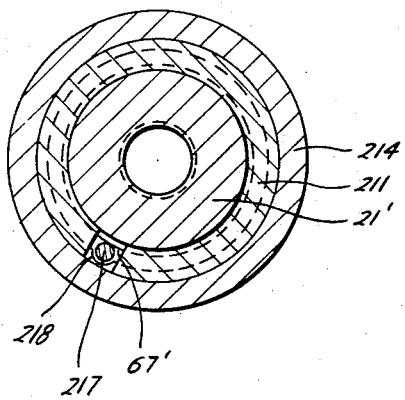
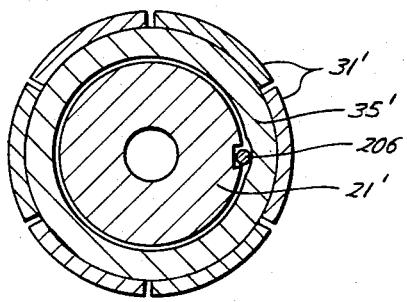
James H. Current
INVENTOR.
BY David L. Mosley
ATTORNEY Sept. 26, 1967 J. H. CURRENT 3,343,607
NON-RETRIEVABLE BRIDGE PLUG
Original Filed Oct. 11, 1965 7 Sheets-Sheet 7
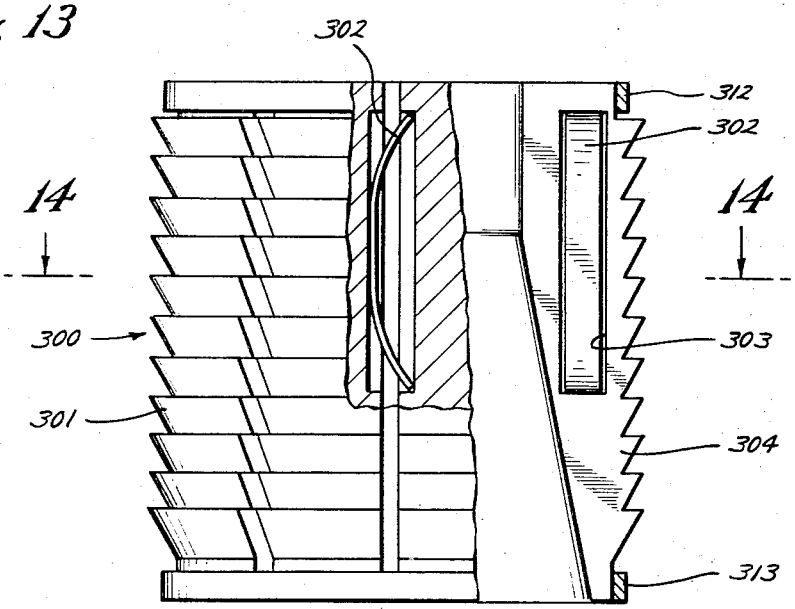
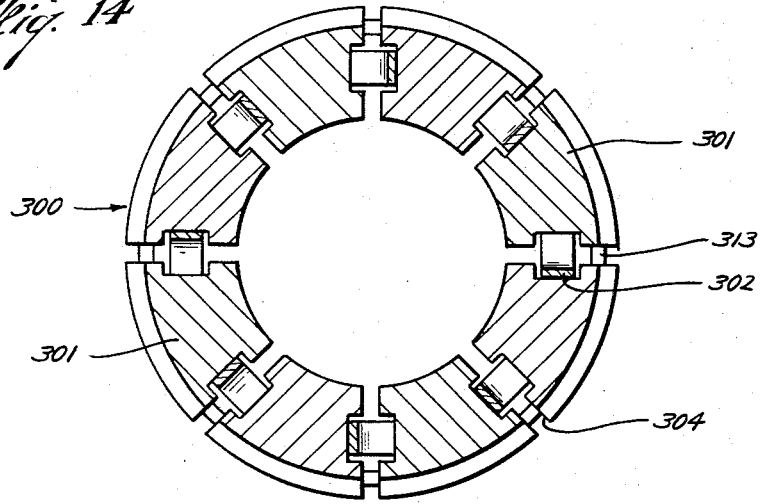
James H. Current
INVENTOR.
BY David L. Moseley
ATTORNEY United States Patent Office 3,343,607
Patented Sept. 26, 1967

3,343,607
NON-RETRIEVABLE BRIDGE PLUG
James H. Current, Houston, Tex., assignor to Schlumberger Technology Corporation, Houston, Tex., a corporation of Texas
Original application Oct. 11, 1965, Ser. No. 500,467, now Patent No. 3,298,440, dated Jan. 17, 1967. Divided and this application Aug. 31, 1966, Ser. No. 576,388
4 Claims. (Cl. 166—182)

This application is a division of application Ser. No. 500,467, filed Oct. 11, 1965, now Patent No. 3,298,440.

This invention relates to bridge plugs for use in well bores; and, more particularly, to bridge plugs which are designed to be set permanently in place within a cased well bore.

It often becomes necessary to isolate or bidge-over a well bore. In such cases, it is customary to lower a bridge plug into the well bore to the desired depth and then expand the plug in place by use of a setting tool. The plug has upper and lower anchor means and, once set, will remain fixed against pressure differentials in either direction.

In general, such bridge plugs basically consist of a central body or mandrel carrying upper and lower sets of normally retracted casing-gripping slips or anchoring devices slidably arranged on upper and lower slip-expanding devices or expanders. The expanders, in turn, are slidably mounted on the mandrel and longitudinally spaced from one another by a normally relaxed pliant or elastomeric packing element or sleeve. The mandrel, slips, expanders and packing element are so arranged that relatively movable members of a setting tool produce a relative movement to expand the packing element between the expanders and wedge the slips into anchoring engagement with the wall of the well bore. A locking device, usually called a body lock, is customarily employed to permanently lock the parts in a set position.

Heretofore, many conventional bridge plugs have employed slip members arranged to separate into several segments when expanded against the casing. It is clear that once these members part, each segment is free to move independently of the others so that when finally engaged, the segments may be erratically spaced. Accordingly, when the several segments are spaced in such an erratic manner, the anchoring forces will be unequally distributed against the casing.

As a bridge plug is being lowered into a cased well, it is not uncommon for an obstruction, such as an internal projection in the casing, to engage the lower slip and force the slip upwardly over the lower expander in such a manner that the lower slip at least slightly expands and perhaps even engages the casing. Heretofore, this particular hazard has often resulted in the premature setting, or at best a partial setting, of the bridge plug which usually requires that the incorrectly located bridge plug be set in place, drilled out, and a new bridge plug again lowered with the hope that it will clear the obstruction and reach its desired depth without being inadvertently set.

Such accidents have also occurred with prior-art devices employing unitized slips having weakened portions designed to fracture into individual segments when the plug is set. With such unitized slips, an encounter with an obstruction can result in the inadventent separation of at least one of the slip segments which then usually becomes lodged between the expander and the casing and prevents further downward movement of the bridge plug. It is obvious that once such a slip segment has been separated, it can not return to its original position and most likely will anchor the plug in the well bore.

Another particularly vexing problem which is commonly experienced is that unless the ends of an elastomeric packing element are totally enclosed when the element is foreshortened to seal off the well bore, the element will tend to extrude through even minute clearance spaces which may remain. This well-known tendency of elastomeric materials to extrude or cold-flow is even more pronounced whenever the packing element is subjected to high pressures, high temperatures, or both. As is well known, it is possible that the elastomeric packing material may be completely forced out of its intended region of sealing through such small clearances thereby resulting in failure of the entire bridge plug.

Heretofore, conventional bridge plugs have utilized several expansible split-rings or nested cup-like members at each end of the packing element to prevent cold-flow of the elastomeric material. Regardless of which type is employed, however, when these conventional expansible members expand against the casing, a gap is left which must be blocked by a second expansible member which is angularly offset from the first.

Although these conventional expansible members are fairly rigid, they will readily expand to a larger diameter to make good contact against uniformly shaped casings. It is rare, however, that a well casing is perfectly round or smooth after it has been set in place within a well bore. For example, the internal surface of a well casing is often disrupted by irregularities such as cement, which had adhered to the wall during cementing operations, or projecting metal spurs or "dog legs" which have been gouged away from the wall of the casing during drilling or remedial operations. Thus, it will be understood that should an anti-extrusion element be expanded into engagement at the particular point where such an irregularity exists, it may be difficult for a rigid element to completely conform to the casing at that point without leaving an opening.

It is, therefore, an object of the present invention to provide reliable bridge plug assembly which will positively seal off the cross section of a casing and will remain in anchoring engagement in a well casing that is irregularly shaped or has irregularities projecting from the internal wall thereof.

It is a further object of the present invention to provide a new and improved bridge plug assembly in which shear pin connections are eliminated.

These and other objects of the present invention are obtained by bridge plug assemblies which include, among other things, various embodiments of new and improved restraining members, slip assemblies and packing element retaining rings.

The bridge plug of the present invention includes a central mandrel carrying at each end thereof opposed sets of integral expansible slip members operatively engaged with frusto-conical slip expanders. An elastomeric packing sleeve element is disposed between the opposed slips and expanders with each end being bonded to and confined within an expansible anti-extrusion ring which positively prevents cold-flow or extrusion of the packing element after it has been sealingly engaged between the mandrel and casing.

The novel slip members of the invention are extendable, with each having a cylindrical outer surface and a circular axial bore which is uniformly tapered along at least a portion of its length so as to diverge outwardly toward one end of the member. It is preferable that a plurality of teeth be uniformly disposed along at least a portion of the outer surface of each member and faced toward the opposite end of the member.

In one embodiment, each slip is integrally formed and made radially expansible by a first series of slots cut radially through the wall of the member at regular intervals around its circumference and extended longitudinally from one end almost to the opposite end thereof. A second series of such slots are alternately disposed between the first series of slots but extended from the member's opposite end almost to the one end of the member.

In an alternate embodiment of the integrally formed slips, a tubular member is formed from a plurality of uniform, metallic, sectorial segments and separated from one another by relatively thin elastomeric members bonded on each side thereof to adjacent segments.

It will be appreciated, therefore, that although both of these slips are integrally formed, they nevertheless have sufficient resiliency to be readily expanded from a smaller to a larger diameter by advancing a frusto-conical expander having a complementary taper into the slip element so as to radially expand it. It will be further appreciated that these slips will remain substantially cylindrical as they are extended but will still adapt themselves to the particular configuration of the casing.

In a third embodiment of a slip, a tubular member is formed from a plurality of segments similar to the above-described embodiment and separated by spring means and held together by yieldable circumferential bands.

The novel anti-extrusion rings of the invention are comprised of an integrally formed cup-shaped member having an annular bottom portion and a skirt portion formed of a series of equally spaced, imbricated, petal-like fingers slightly overlapped at each side with the adjacent fingers on opposite sides. These cup-like rings are slipped over the ends of the elastomeric packing element which is preferably bonded to the inner surfaces of the rings. Arrangement of the fingers in this novel manner allows the fingers to flex radially outwardly to circumferentially expand the skirt portion in response to foreshortening of the sealing element without the fingers becoming separated and with the ends of the imbricated fingers adapting themselves to the configuration of the casing to prevent the formation of any crevice through which the elastomeric packing element might cold flow.

In one manner for locking the mandrel of the bridge plug of the present invention, a sleeve member is mounted around the upper end of the mandrel and receives an annular, split ratchet ring, or body lock, disposed in an inwardly facing annular recess formed around the inner surface of the sleeve member, that cooperatively engages ratchet teeth around the mandrel to prevent the mandrel from traveling downwardly realtive to the packing element. An expansible band is tightly fitted around the body lock to releasably hold the body lock in its initial position until the body lock is first expanded in response to a force of a predetermined magnitude, at which time the band is stretched to free the body lock for its subsequent travel. A downwardly converging tapered surface around the outer periphery of the ratchet ring cooperates with a complementarily-tapered surface around the periphery of the recess to wedge the ratchet ring more tightly against the mandrel whenever a downwardly directed force is applied on the mandrel. An annular resilient member within the recess maintains a downwardly directed biasing force against the ratchet ring as it ratchets downwardly around the mandrel during the setting operation to prevent any backlash or relaxation of the packing element during the brief intervals that the ratchet teeth on the ring are disengaged from the ratchet teeth on the mandrel.

In another arrangement for locking the mandrel of the bridge plug of the present invention, the ratchet ring is cylindrical and its outer surface is provided with upwardly facing annular teeth that are engageable with complementary downwardly facing teeth around the internal bore of the above-mentioned sleeve member. As already described, an annular resilient member is disposed between the sleeve member and upper end of the ratchet ring.

The slip expanders are initially held in an inoperative position by expansible rings tightly fitted in circumferential grooves around the mandrel and engaged with the slip expanders. One of these expansible rings and both slip members are encircled with expansible bands of predetermined strengths for releasably holding these members in their initial positions to allow the various members of the bridge plug to be selectively operated in response to forces of predetermined magnitudes. Consequently, these expansible bands replace the various shear pin arrangements commonly employed heretofore.

In an alternate embodiment of the present invention, a stop member is provided on the mandrel above the upper expander to pervent inadvertent upward movement of that expander relative to the mandrel. Similarly, in this alternate embodiment, a stop member is provided on the mandrel to prevent the lower slip from being shifted upwardly relative to the mandrel.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings, in which:

FIG. 2 shows in perspective one embodiment of an expansible slip member employed in the invention;

FIG. 3 shows a partial sectional view of the slip member of FIG. 2;

FIG. 4 illustrates in perspective an alternate embodiment of an expansible slip member of the present invention;

FIGS. 7A, 7B, 7C and 7D show enlarged views of the details of anti-extrusion ring shown in FIG. 6;

FIG. 8 is a view of the blank used in forming the anti-extrusion ring of FIG. 6;

FIG. 9 is a view showing the bridge plug of FIG. 1 set into sealing and anchoring engagement with a well casing;

FIG. 10 is a view, partly in section, showing another embodiment of a bridge plug of the present invention;

Figure 5:
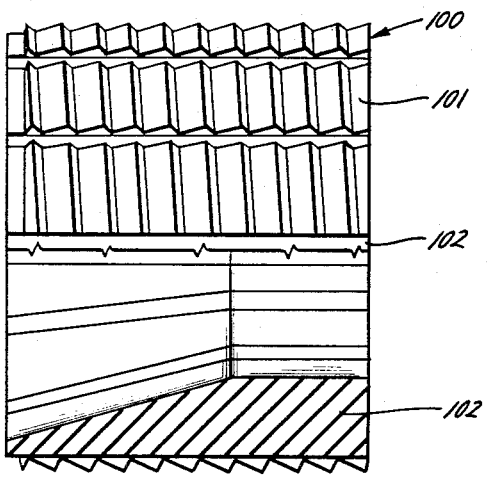
FIG. 5 is a partially sectioned view of the slip member of FIG. 4.

FIGS. 11 and 12 are partial cross-section views respectively taken along the lines 11—11 and 12—12 of FIG. 10;

FIG. 13 is a view similar to FIG. 5 but showing still another slip member of the present invention; and FIG. 14 is a cross-sectional view taken along the lines 14—14 of FIG. 13.

Figure 1:
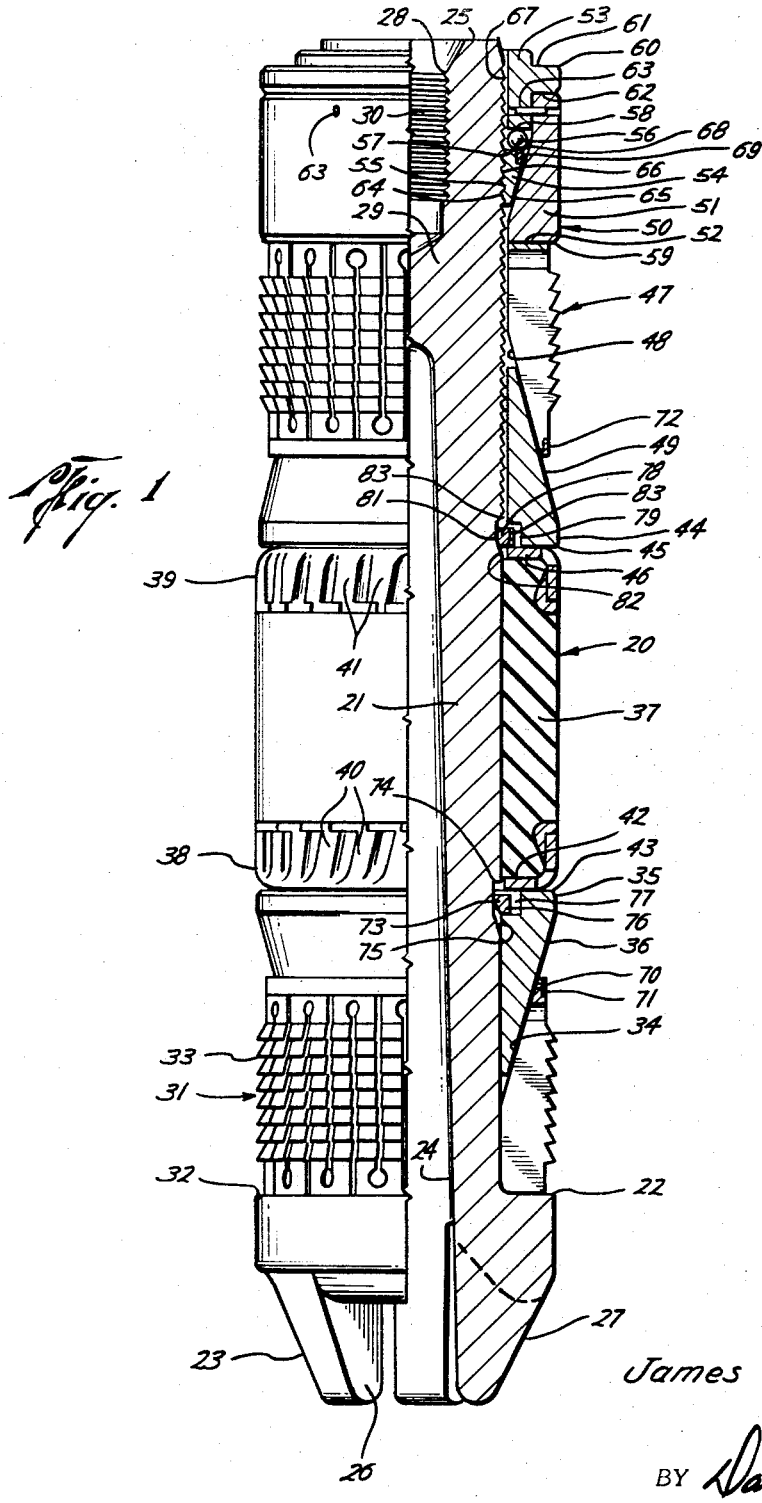
FIG. 1 illustrates one embodiment of a bridge plug, partly in section, arranged in accordance with the principles of the present invention.

Turning now to FIG. 1, one embodiment of a bridge plug 20 constructed in accordance with the principles of the invention is shown. The mandrel 21 is an enlarged cylindrical member having an enlarged diameter frusto-conical portion at its lower end which provides an upwardly facing shoulder 22 and a converging nose 23. The lower end of nose 23 defines the outer opening of a blind axial bore 24 which extends upwardly along the axis of the mandrel 21 for a substantial distance toward the opposite or upper end 25 of the mandrel for a reason which will be subsequently explained in detail. A series of slots or gaps 26 provided in the frusto-conical nose 23 form a plurality of equally spaced lugs 27 thereon, each of which are rounded at their outermost end. At the opposite or upper end 25 of mandrel 21, a second blind axial bore 28 is provided which extends downwardly along the axis of the mandrel but is terminated short of the upper end of axial bore 24 so as to form a solid bridge 29 between the two bores. Internal threads 30 within axial bore 28 provide a means for attaching the mandrel to a conventional setting tool in the well-known manner.

A lower expansible slip member 31, constructed in accordance with the principles of the invention, is slidably disposed around the mandrel with its lower end 32 in engagement with the upwardly facing shoulder 22 of nose 23. Teeth 33 around the outer surface of the slip are directed downwardly and the internal tapered surface 34 of the slip diverges outwardly and upwardly.

A lower slip-expanding member 35 is slidably disposed around mandrel 21 with its outer surfaces 36 complementarily tapered and engaged with the inner tapered surface 34 of the lower expansible slip 31.

An elastomeric packing sleeve 37, which has its ends bonded to oppositely directed lower and upper anti-extrusion rings 38, 39, respectively, and confined within the fingers 40, 41 of the rings 38, 39, is slidably disposed around the mandrel 21 with the base portion 42 of lower anti-extrusion ring 38 resting on the upwardly facing end 43 of lower expander 35. An upper expander 44, identical to but oppositely directed from the lower expander 35, is slidably disposed around mandrel 21 with the downwardly facing end 45 of the expander 44 resting on the base portion 46 of the upper anti-extursion ring 39. An upper slip 47, identical to but oppositely directed from lower slip 31, is slidably disposed around mandrel 21 with its inner tapered surface 48 engaged over the complementarily tapered inwardly and upwardly converging surface 49 of upper expander 44.

An actuating and locking assembly 50, slidably disposed around the upper end 25 of mandrel 21, is arranged to engage upper slip member 47 as the mandrel moves upwardly therethrough and includes a ratchet-lock arrangement which prevents the mandrel from being forced downwardly after the bridge plug is set. The outer members of the assembly 50 include a tubular mandrel-locking sleeve 51 engaging the upper end 52 of upper slip member 47 and fastened at its opposite end to the bottom of an annular setting-tool adapter head 53. The inner members of the locking assembly 50 include a slidable annular ratchet cone or body lock 54 received within and cooperatively engaged with a complementarily tapered inner recess 55 of mandrel-locking sleeve 51.

An O-ring 56, is disposed around mandrel 21 and engaged between the upper end 57 of body lock 54 and the lower end 58 of adapted head 53 for a reason which will be subsequently explained in detail.

Mandrel-locking sleeve 51 is a tubular member having a cylindrical outer surface and an axial bore which is uniformly tapered, as shown at 55, for at least a portion of its length so as to diverge outwardly and upwardly toward the upper end of the locking sleeve to receive body lock 54. The lower end 59 of mandrel-locking sleeve 51 is engaged with the upper end 52 of upper slip member 47.

The setting-tool adapter head 53 is slidably disposed around the upper end 25 of mandrel 21 and is provided with a circumferential flange 60 which projects radially outwardly so as to form an upwardly facing shoulder 61 sized and adapted for engagement with the sleeve member of a conventional setting tool (not shown) in the well-known manner and a downwardly facing shoulder 62 engaged with the upper end of mandrel-locking sleeve 51. Adapter head 53 is attached to the upper end of locking sleeve 51 by either complementary threads or pins 63.

The body lock 54 is an annular split cone nut received within mandrel-locking sleeve 51 and having an internal bore 64 of a uniform diameter and a downwardly converging tapered outer surface 65 complementary to the inner tapered surface 55 of mandrel-locking sleeve 51. The inner bore 64 of body lock 54 is provided with a plurality of upwardly facing ratchet teeth 66 complementarily engaged with a plurality of downwardly facing ratchet teeth 67 around the upper end of mandrel 21. A continuous ring or lock band 68 of a ductile material, such as brass, is received in a peripheral groove 69 around body lock 54. This lock band 68 is proportioned to restrain the expansion of body lock 54 over ratchet teeth 67 of mandrel 21 to prevent relative movement of the elements, such as might occur while connecting the setting tool to the bridge plug, until a substantial force is applied to the bridge plug 20 by the setting tool. When such a substantial force is applied, the ductile ring or lock band 68 is stretched, preferably beyond its elastic limit, as body lock 54 expands over ratchet teeth 67 for the first time. Once band 68 stretches, the body lock 54 is thereafter free and its inherent resilience then permits the body lock to alternately expand and contract as it ratchets downwardly over ratchet teeth 67 until ratchet teeth 66, 67 finally engage in the set position of the bridge plug.

Resilient energy-storing means such as the O-ring 56, is disposed between the lower end 58 of the adapter head 53 and the upper end 57 of the body lock 54 to hold the body lock in engagement with the locking sleeve 51 and advance the body lock along the mandrel during the setting operation.

A bridge plug of the present invention constructed as described so far would be capable of successful operation without further modification or addition thereto. Furthermore, since the new and improved expansible slip members of the invention are resilient, they will readily return to their original shape so long as the mandrel has not been locked. This "memory" or capacity to return to their initial shape is, of course, attributable to the natural elasticity provided by the alternate serrations or by the interposed elastomeric members as described briefly above and in more detail subsequently. Thus, it will be appreciated that a bridge plug of the present invention will tend to resist premature setting to a degree not found heretofore in conventional bridge plugs.

It is nevertheless preferred to provide several additional features to ensure that the slips and packing sleeve remain in their contracted position as the bridge plug is being positioned in a rough well casing as well as to allow the bridge plug to be set in a predetermined sequence. Any one, any combination thereof, or all of these additional features may be incorporated with the bridge plug as described heretofore.

The first of these additional features is a continuous ring or stop band 70 of a ductile material, such as brass, which is received in a peripheral groove 71 around the upper end of the lower slip member 31. This ductile ring 70 provides an additional restraining influence to the inherent resiliency of the lower slip member so the lower slip member will better withstand substantial accidental forces less than those applied by the setting tool when the slip member is permanently set. Although it is preferable that stop band 70 be at the thinner edge of the slip, it would be equally feasible to position it elsewhere around the slip.

It should be noted also that hydrodynamic forces tending to expand lower slip 31 whenever the contracted bridge plug is being pulled upwardly in a fluid-filled hole will also be effectively resisted by stop band 70. Similarly, should lower slip 31 be engaged by an obstruction or projection within the well casing as the bridge plug is being lowered therein, the restraining influence of stop band 70 prevents the lower slip member 31 from expanding and sliding upwardly along lower expander 35.

A second feature which may be added is a second stop band 72 like band 70 but placed around the lower end of upper slip 47. This stop band 72 serves the same function as stop band 70 on the lower slip 31 in addition to controlling the order in which the various elements are set.

In addition to initially preventing premature expansion of the slip members, it has also been found that as they stretch, stop bands 70, 72 continue to exert a uniform restraint as a slip member expands which ensures that the slip segments move outwardly in unison. Thus, it will be appreciated that all slip segments will contact the casing at substantially the same time to centralize the bridge plug as well as to ensure that the outwardly directed forces applied against the casing will be substantially uniform.

Should the lower slip member 31 or the lower expander 35 encounter an obstruction as the bridge plug is being lowered, it will be appreciated that there will be an upwardly directed force tending to foreshorten the packing sleeve 37 which could, in some instances, expand the sleeve sufficiently to allow it to drag along the inner wall of the well casing. Thus, to avoid any upward movement of lower expander 35 relative to mandrel 21, a circumferential groove 73 is formed around mandrel 21 to provide a downwardly facing shoulder 74 at the upper end of the groove with a downwardly and outwardly diverging beveled or tapered portion 75 at the other end thereof. A split stop-ring 76 is received within an annular recess 77 formed in the upwardly facing end of lower expander 35. This lower stop ring 76 is engaged with the upper shoulder 74 of circumferential groove 73 to prevent lower expander 35 from being accidentally forced upwardly. On the other hand, in the normal setting operation, when mandrel 21 is pulled upwardly relative to lower expander 35, the beveled surface 75 of groove 73 will expand lower stop-ring 76 sufficiently to allow it to ride freely down the mandrel. Groove 73 could also be extended downwardly a sufficient distance to eliminate beveled surface 75 and ring 76 would then merely ride down the groove 73 without expanding. Thus, it will be appreciated that mandrel 21 can move freely upwardly relative to lower expander 35 but lower expander 35 cannot move upwardly relative to mandrel 21.

A fourth feature, similar to the one just described, is found at the upper end of packing sleeve 37 and on the mandrel adjacent thereto. A split stop-ring 78 is received within an annular recess 79 around the lower end of the upper expander 44 and engages a downwardly facing shoulder 80 formed at the upper end of a peripheral groove 81 around the mandrel 21 at this point. Shoulder 80 will prevent upward movement of upper stop-ring 78 and packing element 37 relative to the mandrel 21; but as the mandrel begins to travel upwardly, upper stop-ring 78 will be expanded outwardly in the same manner as lower stop-ring 76 by a beveled surface 82 at the lower end of groove 81 to allow the mandrel 21 to move freely upwardly. A continuous stop-ring band 83 of ductile material, such as brass, disposed around the outer periphery of upper stop-ring 78 prevents the stop-ring from expanding upon an accidental engagement of the upper expander 44 or slip member 47 with an obstruction while pulling the bridge plug out of a well while in its contracted position. It will be appreciated that if stop-ring 78 were free to expand, such accidental engagements could move the upper expander 44 downwardly to expand ring 78 over beveled surface 82 and force the packing sleeve 37 outwardly and into possible engagement with the side of the casing. As in the case of the lock band 68 and the slip stop bands 70, 72, stop-ring band 83 is made of a particular strength so as to require a substantial force to expand upper stop-ring 78, which force is still somewhat less than the required force applied by the setting tool to set the bridge plug 20.

The relative strength of stop-ring band 83 with respect to slip stop-bands 70, 72 can be predetermined to vary the order of operation as will be subsequently explained in detail.

Turning now to FIGS. 2 and 3, one embodiment of the novel expansible slip of the invention is seen in detail. Expansible slip 84 is an integral cylindrical member having a series of wickers or teeth 85 disposed around its outer surface and a central bore 86 which diverges outwardly toward one end 87 to form a uniformly tapered inner surface 88. The slip member 84 is made readily expansible by a series of longitudinal slots 89, 90 cut radially through the wall at regular intervals around the member's circumference to form a plurality of sectorial segments 91. The slots 89, 90 are conversely alternated with each other so that slots 89 extend from one end 87 of the member and terminate at radially directed bores 92 near the opposite end of the member. The intermediate slots 90 are similarly formed but extend from the opposite end of the member to their terminus at similar radially directed bores 93 near the first end 87 of the member. Accordingly, segments 91 are interconnected only by a series of webs 94, 95 of equal cross-sectional area which, for example, respectively join one end of a particular segment 96 to the corresponding end of the adjacent segment 97 on one side and join the opposite end of that particular segment 96 to the corresponding end of the adjacent segment 98 on the other side thereof. Thus, it will be appreciated that upon application of an outwardly directed force, this alternate arrangement of slots will permit circumferential expansion of the slip member as the several segments move apart circumferentially and radially with the connecting webs acting as pivots.

At the leading edge of thinner end 87 of the slip member, a peripheral groove 99 is provided to receive the ductile stop bands 70, 72 previously described above.

Turning now to FIGS. 4 and 5, an alternative embodiment of the novel expansible slip member is seen in detail. Expansible slip member 100 is substantially identical in its overall configuration to expansible slip member 84 but is instead formed from a plurality of individual sectorial segments 101 which are spaced apart and joined by a plurality of relatively thin elastomeric strips 102 bonded to adjacent segments. Here again, a ductile stop band similar to stop bands 70, 72 may be used around the slip member 100.

Figure 6:
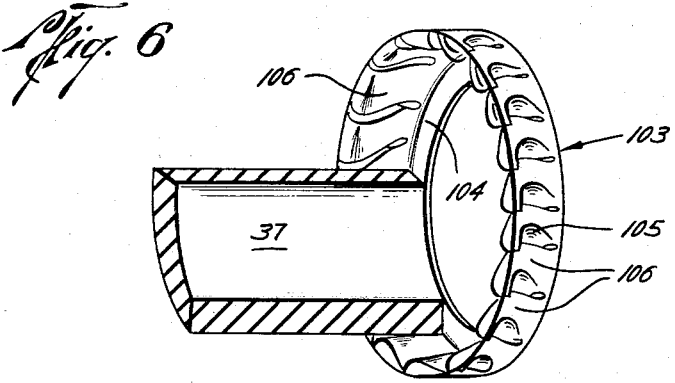
FIG. 6 shows in perspective an embodiment of the anti-extrusion ring of the invention.
Figure 7A:
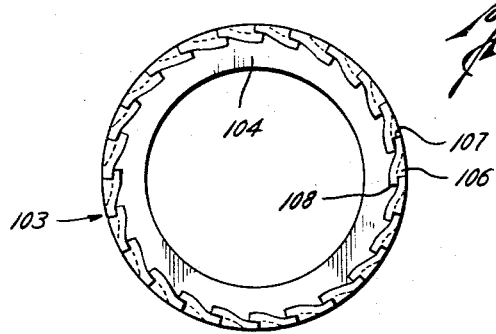

The novel anti-extrusion rings used in the bridge plug 20 of the present invention are shown in perspective in FIG. 6, and in detail in FIGS. 7A–7D. As seen in perspective in FIG. 6, the anti-extrusion ring 103 is an integrally formed, cup-shaped, expansible member having an annular base portion 104 and a circumferentially expansible skirt portion 105 extending upwardly around the periphery of the base portion 104.

The skirt portion 105 is readily expansible by virtue of the imbricated finger-like segments 106 which are each twisted slightly about their central axis and symmetrically arranged with one another so that one edge 107 of each segment slightly overlaps the outer face of segment adjacent that edge 107, and the opposite edge 108 of each segment slightly overlaps the inner face of segment adjacent that opposite edge 108. The outer or free end 109 of each segment 106 has an upwardly facing shoulder 110 on that edge 107 overlapping the outer face of the segment adjacent that edge and a tab portion 111 on the opposite edge 108 overlapping the inner face of the segment adjacent that opposite edge. Each tab portion 111 is bent radially outwardly over the shoulder 110 of the segment adjacent thereto.

As illustrated in part in FIGS. 6 and 7B, each end of the elastomeric packing element 37 is received in and contained by one of the cup-like anti-extrusion rings 103. It is preferable, but not essential, that the packing element 37 be bonded to the base and skirt portions of the anti-extrusion rings.

Thus, it will be appreciated that when the packing element 37 is foreshortened as it is being displaced into engagement with the casing, a force will be applied uniformly in all directions against the inside of the anti-extrusion rings by virtue of the well-known tendencies of elastomeric materials to behave substantially as relatively non-compressible fluids. Accordingly, as this force increases, the skirt portion 105 will begin expanding radially outwardly with each segment assuming the position shown by dashed lines 112 in FIG. 7B where the free ends 109 circumscribe a circle of greater diameter than their initial diameter. The radial movement will continue until the outwardly turned portion 113 of each finger-like segment 106 firmly engages the inner wall of the casing 114.

Thus, by employing a large number of such finger-like segments 106, the outwardly turned portion 113 of the segments will be tightly sealed and engaged against the inner wall of the casing 114 and will tend to closely follow the configuration of the casing despite any normal irregularity or out-of-roundness. It will be appreciated that should there be a protrusion at one point in the casing, the segment adjacent that protrusion will not expand as far as the segments on either side thereof which allows the anti-extrusion rings 103 to conform to the casing wall to a degree which has not been heretofore attainable.

The blank 115 used in manufacturing the anti-extrusion rings of the invention is shown in FIG. 8. As illustrated, the blank 115 is a polypetalous annular disc with the equally spaced and uniform sectorial segments 106 around its outer edge. The free ends 109 of the segments have cutout portions 116 on edges 107 to form square shoulders 110 on those edges and leaving projecting tab portions 111 on the opposite edges 108.

The blank is formed into the anti-extrusion ring 103 of the invention by a series of conventional forming operations which sequentially bend the tab portions 111 of the segments 106 downwardly at substantially right angles to the main portion of the segments; twists each segment slightly around its central axis so as to dispose the edge 108 of each segment below the plane of the opposing edge 107 of the segment adjacent thereto; and then folds the main portion of the segments upwardly at substantially right angles to the annular disc portion or base 104 of the ring 103 with the bent-over tabs 111 coming to rest and engaged over the shoulders 110 of the adjacent segments and directed radially outwardly. Any excessive protrusion of the tab portions 111 is then ground off to provide a smooth outer surface 117 which, when expanded against the casing as shown in FIG. 9, will continuously engage the casing without interruption.

Although the segments are usually separated by a slitting or parting operation so as to leave extremely narrow gaps 118 between adjacent segments, it is sometimes desirable to form a filet 119 (FIG. 7B) at the base of the segments around the inside of the cup to preclude the possibility that even a minute gap might be opened at the base of the slits 118 when the skirt portion expands. This filet may be formed by weld metal, of some yieldable metal such as lead or babbitt, or of any metallic or plastic material which will seal the base of the slits 118 to prevent the extrusion or cold-flow of the elastomeric packing element therethrough under adverse conditions of high temperature and or pressure.

The overlapping of the segments 106 will positively close all gaps that might exist at all points above the base portion 104 of the rings. It will also be appreciated that, as seen in FIG. 7D, the turned-over and ground ends of the tab portions 111 of the segments provide a continuous circumferentially expansible contact surface 117 with tab portions 111 slidably engaging shoulders 110 of the adjacent segments which reinforces the turned-over tab portions as the skirt 105 expands circumferentially.

In FIG. 9, the bridge plug 20 of FIG. 1 is shown as it will appear when set in place within a casing 114. The outer sleeve 120 (partially shown) of a conventional setting tool (not shown) has been engaged with the upwardly-directed shoulder 61 of setting-tool adapter head 53 and a conventional shear stud 121 (partially shown) connecting the inner mandrel (not shown) of the setting tool. Mandrel 21 has been pulled upwardly while the outer sleeve 120 was forced downwardly to set the bridge plug 20, with the stud 121 subsequently shearing to disengage the setting tool whenever the applied forces reached the shear point of stud 121.

It will be appreciated that when the bridge plug is set and the setting tool has been disengaged, any upwardly directed forces on the bridge plug will be carried by the upper slips 47 and that the mandrel 21 cannot move upwardly without tending to set the packing element 37 and upper slips even more tightly. On the other hand, only the effectiveness of body lock 54 prevents a downwardly directed force from forcing the mandrel 21 downwardly through the packing element 37. Thus, it is important that ratchet teeth 66, 67 be held in firm engagement.

This firm engagement is ensured by the wedging action produced by tapered surfaces 55, 65 on locking sleeve 51 and body lock 54, respectively. A downwardly directed force on the mandrel 21 will act through ratchet teeth 66, 67 and tend to drive body lock 54 downwardly, which tendency will wedge body lock 54 inwardly to engage ratchet teeth 66, 67 even more tightly.

When the setting tool is operated and as the mandrel 21 first begins to travel upwardly, ratchet teeth 67 on the mandrel will slide under ratchet teeth 66 on body lock 54 to cam that member outwardly and stretch lock band 68. Accordingly, as soon as lock band 68 is sufficiently stretched, body lock 54 is free to expand and contract; and each time the body lock expands over ratchet teeth 67, it will tend to slide relatively upwardly along the tapered surface 55 of locking sleeve 51 which is held by setting tool sleeve 120 acting through adapter head 53. As body lock 54 begins to slide upwardly, however, O-ring 56 is compressed and then expands to drive the body lock 54 downwardly to force body-lock ratchet teeth 66 back into engagement with the ratchet teeth 67 around the mandrel. This alternate compression and expansion of O-ring 56 will tend to drive body lock 54 downwardly while preventing any "backlash" or retrograde movement upwardly. It will be appreciated, therefore, that body lock 54 will be sequentially driven over the lowest ratchet teeth 67 on the mandrel that it can engage and that packing element 37 cannot relax.

When the bridge plug is firmly anchored into sealing engagement with the casing, the upward force on the mandrel will finally increase sufficiently to fracture shear stud 121, which allows retrieval of the setting tool in the well-known manner.

As previously mentioned, various operational sequences can be obtained by varying the relative strength of stop-ring band 83 with respect to slip-stop bands 70, 72. Furthermore, the strength of slip-stop bands 70, 72 can also be varied with respect to each other. Thus, these stop bands eliminate the need for shear pin members as employed in prior art devices, and may be used whenever shear pins appear.

If for example, stop-ring band 83 is made weaker than the slip-stop band 72, as the setting tool applies an upwardly directed force on the mandrel and a downwardly directed force on adapted head 53, mandrel 21 will not begin moving upwardly until the forces have reached a predetermined magnitude sufficient to stretch stop-ring band 83 and allow upper stop ring 78 to expand over bevel 82 of groove 81. Whenever the upper stop ring 78 expands, the lower stop ring 76 is also expanded over beveled surface 75 to free the mandrel. Thus, it will be appreciated that once the mandrel is freed, the oppositely directed forces applied by the setting tool will then be directed against the bases of the slip members 31, 47 to begin forcing them upon their respective expanders 35, 44. In this case, it is preferred to make slip-stop bands 70, 72 of sufficient strength to allow the packing element 37 to be at least almost fully seated against the casing 114 before the stop bands 70, 72 stretch sufficiently to allow the slips 31, 47 to engage the casing. It would be equally feasible, of course, to make one of the slip-stop bands slightly stronger than the other if it were preferred that one slip member be set against the casing before the other slip member is set.

The preferred manner of operation, however, is to make stop-ring band 83 somewhat stronger than the slip-stop band 72. In this instance, the mandrel 21 will be held fixed relative to the upper expander 44 which will cause the upper slip member 47 to be driven downwardly onto upper expander 44 whenever the applied forces reach sufficient magnitude to stretch slip-stop band 72. After the upper slip member 47 has been fully expanded into anchoring engagement with the casing, the upwardly directed force on the mandrel 21 will then increase until stop-ring band 83 stretches sufficiently to allow upper stop ring 78 and lower stop ring 76 to ride up onto their respective beveled surfaces 82, 75 and free the mandrel 21 relative to the expanders 35, 44. The continuing upwardly directed force will then move the mandrel upwardly with lower slip member 31 and lower expander 35 foreshortening packing element 37 against the firmly held upper expander 44 until the packing element is fully displaced into sealing engagement with casing 114.

It is optional whether lower slip-stop band 70 is stronger than the force required to displace or expand packing element into sealing engagement, but it is preferred to make it so to allow the packing element to be substantially displaced before the lower slip 31 is fully expanded against the casing 114 to minimize the dragging of that slip against the casing wall.

Although a bridge plug is usually intended to be set in place permanently, it is sometimes necessary to remove it. Removal of a bridge plug is conventionally done by drilling or "milling" the plug with drilling bits. Accordingly, as is well-known in the art, the mandrel and other elements are made of such drillable metals as cast iron or magnesium.

The blind axial bore 24, previously described, extends a sufficient distance inside mandrel 21 to ensure that when the bridge plug is permanently set, bridge 29 is well above the upper slip member 47. Thus, it will be appreciated that as the bridge plug is milled away, bridge 29 will be first cut away before the upper slip member is disturbed. This will accordingly allow any pressure that may be below the bridge plug to bleed-off before the upper slip member is cut away to release the bridge plug. As is well-known in the art, if such a precaution were not taken and there was a substanial well bore pressure under the bridge plug, it would be possible that when the upper slip is released, the remaining portion of the plug would be forcibly propelled upwardly and possibly drive the drill bit and drill string out of the well bore.

Turning now to FIG. 10, an alternate embodiment is shown of a bridge plug 200 that is essentially arranged as bridge plug 20 already described. Inasmuch as bridge plug 200 employs most of the elements already described with respect to bridge plug 20, the same reference numbers but with a prime mark are used to designate the principal common element of the two embodiments.

One of the principal distinctions between bridge plug 20 and 200 is that the latter tool includes means for further assuring that bridge plug 200 will not be prematurely set should it accidentally strike an obstruction in a well. For example, although stop band 70' will prevent many accidental expansions of lower slip 31', a particularly sharp upward blow against the slip could, nevertheless, drive it upwardly and expand it over the lower expander 35'. To prevent this, the lower portion of the mandrel 21' is enlarged to provide a shoulder 201 that is loosely received in a complementary annular recess 202 within lower slip 31'.

For facilitating the assembly of the lower slip 31' over the mandrel 21', the upper surface of shoulder 201 is tapered, as at 203, to enable the lower end of the slip to be expanded slightly and slid over the shoulder and into its final position. Once slip 31' is in position, stop band 70' can then be installed in the usual manner. It will also be realized that shoulder 201 will not interfere with the intentional setting of slip 31' inasmuch as it is never necessary for the slip to move either upwardly or downwardly with respect to mandrel 21'.

Similar steps are provided to prevent upward movement of upper expander 44' relative to mandrel 21'. It will be noted that should such a movement occur, the upper slip 47' will be expanded. Accordingly, stop means, such as an internally threaded ring 204, are engaged between the mandrel 21' and upper expander 44' to prevent its upward movement relative to the mandrel.

Although ring 204 could be made continuous and easily threaded down over mandrel ratchet teeth 67' into engagement with expander 44', the ring is preferably split to expedite its assembly onto bridge plug 200. By splitting the ring 204, it can be quickly pressed downwardly to ratchet it over the teeth 67'. Then, to prevent its accidental expansion from threaded engagement with threads 67', the split-nut 204 is confined within an upwardly directed recess 205 at the upper end of expander 44'. Thus, with ring 204 closely confined in recess 205, it can no longer be expanded sufficiently to disengage the ring's threads from mandrel threads 67'. It will also be appreciated that stop ring 204 will in no way hamper the setting of bridge plug 200 since, as it is being set, mandrel 21' is pulled upwardly. Thus, as mandrel 21' moves upwardly, stop ring 204 will be disengaged from expander 44' and pass under upper slip 47' after it has been expanded.

Accordingly, it will be recognized that the additional stop means provided by shoulder 201 and split-ring 204 will further prevent the accidental setting of bridge plug 200 should either lower slip 31' or upper expander 44' strike an obstruction in a well bore.

As an added feature to facilitate drilling through the bridge plug 200, a pin 206 is loosely received within opposed longitudinal grooves 207 and 208 respectively formed in adjacent, facing surface portions of lower expander 35' and mandrel 21'. It will be realized, of course, that although groove 207 is sufficiently long enough that the loosely received pin 206 will not retard upward travel of mandrel 21' relative to lower expander 35', the pin will co-rotatively secure the members to prevent their relative rotation. Thus, as mandrel 21' is being drilled-out by a rotative drilling tool (not shown), the mandrel will be prevented from turning by pin 206 and the frictional engagement of expander 35' with lower slip 31'.

Although other configurations may be used, it is preferred that groove 207 have an arcuate cross-section rather than a rectangular cross-section as does groove 208. Thus, as best seen in FIG. 12, by making pin 206 cylindrical, rotation of mandrel 21' relative to expander 35' will tend to "cam" the pin against the groove 207 and thereby carry part of the torsional force thereon as a lateral compressive load on the pin rather than only as a diametrical shearing load.

Still another feature is provided by inserting a sealing member, such as an elastomeric plug 209, into the upper axial bore 28' and securing it in place with a threaded plug 210. Thus, where the material of mandrel 21' is possibly permeable as, for example, by reason of hidden inclusions in cast iron and the like, the sealing plug 209 will prevent leakage that may occur through the bridge 29'.

As seen in FIG. 10, the locking assembly 50' is arranged whereby body lock 54 and lock ring 68 (FIG. 1) are replaced by a split ratchet ring 211 having upwardly directed internal teeth 212 adapted to complementarily engage mandrel teeth 67' as well as having upwardly directed external teeth 213. The separate locking sleeve 51 and adaptor head 53 (FIG. 1) are preferably replaced by a unitary head 214 having a downwardly facing cylindrical annular recess 215 in which downwardly facing internal teeth 216 are formed for a loose but complementary engagement with external ratchet teeth 213. Resilient energy-storing means, as an O-ring 57', are disposed in recess 215 and engaged between head 214 and the upper end of ratchet ring 211.

To prevent rotation of the ratchet ring relative to the head 214, a cylindrical pin 217 is loosely disposed in the space between the opposed ends of the split-ring 211. As best seen in FIG. 11, a longitudinal slot 218 having a semi-circular cross-section is cut through the internal threads 216 of head 214 for loosely receiving the portion of pin 217 projecting outwardly beyond the crest of threads 213. Thus, with pin 217 in position, it will be appreciated that ring 211 will be unable to rotate relative to the head 214 but is still free for rotation and downward travel relative to the upwardly moving mandrel.

When the bridge plug 200 is set, it will function essentially as already described with reference to bridge plug 20. With respect to the locking assembly 50', however, it will be noted that the external teeth 213 around ratchet ring 211 are upwardly directed but the upper surfaces of these teeth are sloped slightly outwardly and downwardly. The mating teeth 216 within head 214 are, of course, complementary with teeth 213.

By leaving a radial clearance between the crests and roots of threads 213 and 216 that is sufficient to permit ring 211 to expand radially and disengage threads 212 from threads 67', it will be seen that as mandrel 21' moves upwardly relative to the ring 211 and head 214, mandrel threads 67' will serve as cams against threads 212 to expand ring 211 outwardly. As the ring 211 expands, it will engage threads 213 and 216 more tightly. Then, once threads 212 clear threads 67', the ring 211 will again contract to re-engage the threads 212 with the next lower set of threads 67' but without totally disengaging threads 213 and 216.

Thus, as mandrel 21' is pulled upwardly relative to ratchet ring 211 and head 214, the ratchet ring 211 will alternately expand and contract to permit threads 67' to pass upwardly through the ratchet ring. Here again, as was previously explained with respect to locking assembly 50, the O-ring 57' will function to momentarily allow ratchet ring 211 to retrogress as it is being disengaged from threads 67', but, once the O-ring is compressed, whenever the ratchet ring clears the threads 67', the O-ring 57' will urge the ratchet ring downwardly and over the next lower set of mandrel threads.

Turning now to FIG. 13, an alternate embodiment is shown of a slip member 300 that, as part of the present invention, may be used with either bridge plug 20 or 200. Slip member 300 is substantially similar to slip member 100 but differs in that the individual segments 301 of slip member 300 are not joined together.

As seen in both FIGS. 13 and 14, the individual segments 301 are held in juxtaposition by ductile bands 312 and 313 respectively encircling the upper and lower ends of slip member 300. To laterally urge the individual segments 301 apart as the slip member 300 is expanded, means, such as arcuate springs 302, are disposed between adjacent surfaces of the segments. By disposing spring 302 within longitudinal recesses 303 formed in the abutting radial surfaces 304 of the segments 301, the ends of the springs are secured and the springs deflected as two adjacent segments are brought together during assembly of the slip 300. Then, as the slip 300 is expanded by an expander cone (not shown), and bands 312 and 313 stretched, the stored force of each of the springs 302 will act laterally on the slip segments 301 in conjunction with the bands to maintain the uniform spacing of the segments as they approach the casing wall. Thus, by maintaining this uniform spacing of slip segments 301, the bridge plug is assured of being set centrally within the casing.

It will be appreciated, therefore, that the new and improved bridge plugs of the present invention are reliable apparatus with improved body locks and with expansible slip members which will positively seal against and remain in an evenly-loaded anchoring engagement with even an irregularly shaped casing while affording substantial protection against inadvertent and premature setting of the apparatus. The unique design of the anti-extrusion ring will prevent cold-flow of the packing element under the most rigorous conditions as well as conform to the internal casing wall to a degree which has not been attainable heretofore.

It will be further appreciated that the expansible stop bands around the slips, the body lock and the upper stop ring in addition to preventing inadvertent setting of the device, also eliminate the necessity for the various shear pin arrangements, wherever they may appear, commonly employed heretofore. Thus, as the setting tool is setting the new and improved bridge plugs of the present invention, the elements will move positively and in a predetermined sequence to their respective positions without any sudden shocks being imparted to the bridge plug as is the case when a shear pin fails.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

I claim:

1. In a packer having a packing element operatively mounted around a mandrel and adapted for expansion into sealing engagement with a wall of a well bore for packing off the well bore in response to an upwardly directed force on said mandrel in conjunction with a downwardly directed force on said packing element, the combination with said packer of: means operatively coupled to the upper end of said packing element for imparting a downwardly directed force thereto including a sleeve member movably mounted around said mandrel, said sleeve member having an annular internal recess facing said mandrel and forming a downwardly facing shoulder; detaining means for temporarily preventing upward travel of said mandrel relative to said sleeve member including an annular expansible mandrel-gripping member disposed within said recess below said shoulder and releasably engaged with said mandrel, and an annular yieldable restraining member contracted around said gripping member and expandable in response to an upwardly directed force of a predetermined magnitude on said gripping member for releasing said gripping member from engagement with said mandrel; and cam means on said mandrel below and against said gripping member for expanding said gripping and restraining members outwardly whenever such an upwardly directed force of predetermined magnitude is applied to said mandrel in conjunction with a downwardly directed force on said sleeve member.

2. In a packer having a packing element operatively mounted around a mandrel and adapted for expansion into sealing engagement with a wall of a well bore for packing off the well bore in response to an upwardly directed force on said mandrel in conjunction with a downwardly directed force on said packing element, the combination with said packer of: means operatively coupled to the upper end of said packing element for imparting a downwardly directed force thereto including a sleeve member movably mounted around said mandrel, said sleeve member having an annular internal recess facing said mandrel and forming a downwardly facing shoulder; detaining means for temporarily preventing upward travel of said mandrel relative to said sleeve member including an annular expansible mandrel-gripping member disposed within said recess below said shoulder and releasably engaged with said mandrel, and an annular yieldable restraining member contracted around said gripping member and expandable in response to an upwardly directed force of a predetermined magnitude on said gripping member for releasing said gripping member from engagement with said mandrel; cam means on said mandrel below and against said gripping member for expanding said gripping and restraining members outwardly whenever such an upwardly directed force of predetermined magnitude is applied to said mandrel in conjunction with a downwardly directed force on said sleeve member; and means for securing said mandrel in an elevated position relative to said sleeve member including a downwardly facing inwardly tapering external surface on said gripping member above and coengageable with a complementary internal surface in said recess for contracting said gripping member into re-engagement with said mandrel upon downward travel of said mandrel relative to said sleeve member.

3. The packer of claim 2 further including resilient means between said shoulder and gripping means for urging said gripping member toward said complementary surface to prevent downward travel of said mandrel relative to said sleeve member.

4. In a packer having a packing element operatively mounted around a mandrel having ratchet teeth around its upper end, said packing element being adapted for expansion into sealing engagement with a wall of a well bore for packing off the well bore in the response to an upwardly directed force on said mandrel in conjunction with a downwardly directed force on said packing element, the combination with said packer of: means operatively coupled to the upper end of said packing element for imparting a downwardly directed force thereto including a sleeve member movably mounted around said mandrel ratchet teeth, said sleeve member having an annular internal recess facing said mandrel and forming a downwardly facing shoulder and an upwardly facing tapered surface converging downwardly toward said mandrel; means for temporarily preventing upward travel of said mandrel and for preventing downward travel of said mandrel relative to said sleeve member including an annular expansible ratchet ring disposed within said recess around said mandrel and having internal ratchet teeth releasably engaged with said mandrel ratchet teeth, said ratchet ring having an outer surface complementarily tapered and engaged with said tapered recess surface; means responsive to an upwardly directed force of a predetermined magnitude on said mandrel for disengaging said ratchet teeth including an annular yieldable restraining member contracted around said ratchet ring and adapted to yield whenever such a force of predetermined magnitude is applied to allow said mandrel ratchet teeth to expand said ratchet ring and restraining member outwardly to release said mandrel for upward travel; and resilient means operatively engaged between said recess shoulder and said ratchet ring biasing said ratchet ring downwardly against said tapered recess surface for contracting ratchet ring to re-engage said ratchet teeth upon downward travel of said mandrel relative to said sleeve member.

References Cited

UNITED STATES PATENTS

| | | | |
|---|---|---|---|
| 1,050,557 | 1/1913 | McLaughlin | 166—182 |
| 2,041,439 | 5/1936 | Singleton | 166—182 X |
| 2,841,224 | 7/1958 | Baker et al. | 166—134 |
| 3,000,443 | 9/1961 | Thompson | 166—135 |
| 3,091,293 | 5/1963 | Fry | 166—134 X |
| 3,094,169 | 6/1963 | Conrad | 166—134 |
| 3,285,343 | 11/1966 | Urbanosky | 166—134 |
| 3,303,885 | 2/1967 | Kisling | 166—134 |

CHARLES E. O'CONNELL, *Primary Examiner.*

DAVID H. BROWN, *Examiner.*